US012699967B2

(12) United States Patent
Horgan et al.

(10) Patent No.: US 12,699,967 B2
(45) Date of Patent: Aug. 4, 2026

(54) TECHNICIAN SERVICE ACTION AUDITING FOR COMPLIANCE

(71) Applicant: NCR Atleos Corporation, Atlanta, GA (US)

(72) Inventors: Kevin Horgan, Broughty Ferry (GB); Michael James Neilan, Dundee (GB); Sai Teja Kasha, Dundee (GB); Mark William Reilly, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/675,340

(22) Filed: May 28, 2024

(65) Prior Publication Data

US 2025/0371503 A1     Dec. 4, 2025

(51) Int. Cl.
| | |
|---|---|
| *G06Q 30/00* | (2023.01) |
| *G06Q 10/20* | (2023.01) |
| *G06T 7/00* | (2017.01) |

(52) U.S. Cl.
CPC ........... *G06Q 10/20* (2013.01); *G06T 7/0002* (2013.01)

(58) Field of Classification Search
None
See application file for complete search history.

(56) References Cited

U.S. PATENT DOCUMENTS

| | | | | |
|---|---|---|---|---|
| 2004/0010444 | A1* | 1/2004 | Delorme .............. | G01R 31/281 |
| | | | | 702/183 |
| 2006/0110045 | A1* | 5/2006 | Reissman ............. | G06T 7/0002 |
| | | | | 382/203 |

| | | | | |
|---|---|---|---|---|
| 2010/0169230 | A1* | 7/2010 | Glotzbach .............. | G06Q 10/20 |
| | | | | 705/305 |
| 2017/0292725 | A1* | 10/2017 | Conley .................... | F24F 11/39 |
| 2019/0035146 | A1* | 1/2019 | Nowicki .............. | G01S 7/4808 |
| 2020/0210966 | A1 | 7/2020 | Nuthi et al. | |
| 2020/0304653 | A1* | 9/2020 | Tanaka .............. | H04N 1/00244 |
| 2022/0092438 | A1* | 3/2022 | Casey .................. | G06V 10/764 |
| 2022/0351365 | A1 | 11/2022 | Fowler et al. | |
| 2023/0259821 | A1 | 8/2023 | Travalini et al. | |

(Continued)

OTHER PUBLICATIONS

F. Lamberti, F. Manuri, A. Sanna, G. Paravati, P. Pezzolla and P. Montuschi, "Challenges, Opportunities, and Future Trends of Emerging Techniques for Augmented Reality-Based Maintenance," in IEEE Transactions on Emerging Topics in Computing, vol. 2, No. 4, pp. 411-421, Dec. 2014 (Year: 2014).*

(Continued)

*Primary Examiner* — Matthew T Sittner
(74) *Attorney, Agent, or Firm* — Schwegman Lundberg & Woessner, P.A.

(57) ABSTRACT

During a service call of a technician to resolve a problem with a terminal, images of components of the terminal being services are captured. The images are analyzed for compliance to determine whether service actions of the technician with respect to the components are correct or incorrect. When image analysis indicates a non-compliant action was taken by the technician, a real time alert is provided to the technician and/or to a site manager responsible for the terminal. In an embodiment, a model image for a compliant action associated with any non-compliant action is provided to the technician.

8 Claims, 7 Drawing Sheets

(56) References Cited

U.S. PATENT DOCUMENTS

2023/0334433 A1 * 10/2023 Zhu ........................ G06Q 10/20
2024/0257335 A1 * 8/2024 Zylstra ................... G06Q 10/20

OTHER PUBLICATIONS

D. Lang, S. Grunau, L. Wisniewski and J. Jasperneite, "Utilization of the Asset Administration Shell to Support Humans During the Maintenance Process," 2019 IEEE 17th International Conference on Industrial Informatics (INDIN), Helsinki, Finland, 2019 (Year: 2019).*

* cited by examiner

140

150

151

151-1

SUBMIT PHOTO                    152

RETAKE PHOTO                    153

160

200

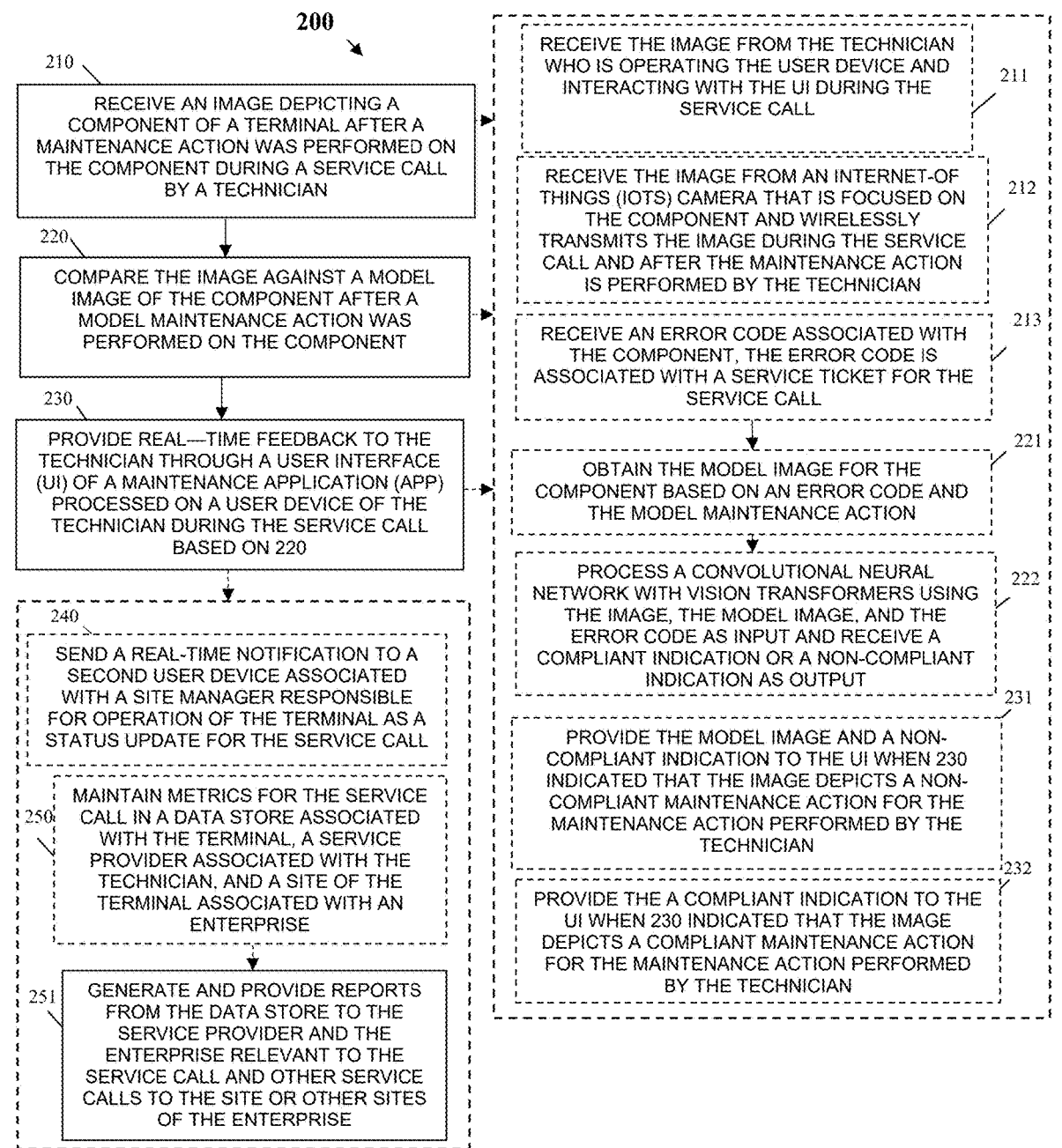

210

RECEIVE AN IMAGE DEPICTING A COMPONENT OF A TERMINAL AFTER A MAINTENANCE ACTION WAS PERFORMED ON THE COMPONENT DURING A SERVICE CALL BY A TECHNICIAN

220

COMPARE THE IMAGE AGAINST A MODEL IMAGE OF THE COMPONENT AFTER A MODEL MAINTENANCE ACTION WAS PERFORMED ON THE COMPONENT

230

PROVIDE REAL—TIME FEEDBACK TO THE TECHNICIAN THROUGH A USER INTERFACE (UI) OF A MAINTENANCE APPLICATION (APP) PROCESSED ON A USER DEVICE OF THE TECHNICIAN DURING THE SERVICE CALL BASED ON 220

240

SEND A REAL-TIME NOTIFICATION TO A SECOND USER DEVICE ASSOCIATED WITH A SITE MANAGER RESPONSIBLE FOR OPERATION OF THE TERMINAL AS A STATUS UPDATE FOR THE SERVICE CALL

250

MAINTAIN METRICS FOR THE SERVICE CALL IN A DATA STORE ASSOCIATED WITH THE TERMINAL, A SERVICE PROVIDER ASSOCIATED WITH THE TECHNICIAN, AND A SITE OF THE TERMINAL ASSOCIATED WITH AN ENTERPRISE

251

GENERATE AND PROVIDE REPORTS FROM THE DATA STORE TO THE SERVICE PROVIDER AND THE ENTERPRISE RELEVANT TO THE SERVICE CALL AND OTHER SERVICE CALLS TO THE SITE OR OTHER SITES OF THE ENTERPRISE

211

RECEIVE THE IMAGE FROM THE TECHNICIAN WHO IS OPERATING THE USER DEVICE AND INTERACTING WITH THE UI DURING THE SERVICE CALL

212

RECEIVE THE IMAGE FROM AN INTERNET-OF-THINGS (IOTS) CAMERA THAT IS FOCUSED ON THE COMPONENT AND WIRELESSLY TRANSMITS THE IMAGE DURING THE SERVICE CALL AND AFTER THE MAINTENANCE ACTION IS PERFORMED BY THE TECHNICIAN

213

RECEIVE AN ERROR CODE ASSOCIATED WITH THE COMPONENT, THE ERROR CODE IS ASSOCIATED WITH A SERVICE TICKET FOR THE SERVICE CALL

221

OBTAIN THE MODEL IMAGE FOR THE COMPONENT BASED ON AN ERROR CODE AND THE MODEL MAINTENANCE ACTION

222

PROCESS A CONVOLUTIONAL NEURAL NETWORK WITH VISION TRANSFORMERS USING THE IMAGE, THE MODEL IMAGE, AND THE ERROR CODE AS INPUT AND RECEIVE A COMPLIANT INDICATION OR A NON-COMPLIANT INDICATION AS OUTPUT

231

PROVIDE THE MODEL IMAGE AND A NON-COMPLIANT INDICATION TO THE UI WHEN 230 INDICATED THAT THE IMAGE DEPICTS A NON-COMPLIANT MAINTENANCE ACTION FOR THE MAINTENANCE ACTION PERFORMED BY THE TECHNICIAN

232

PROVIDE THE A COMPLIANT INDICATION TO THE UI WHEN 230 INDICATED THAT THE IMAGE DEPICTS A COMPLIANT MAINTENANCE ACTION FOR THE MAINTENANCE ACTION PERFORMED BY THE TECHNICIAN

FIG. 2

TECHNICIAN SERVICE ACTION AUDITING FOR COMPLIANCE

BACKGROUND

Regrettably, many service calls intended to address issues with transaction terminals often fail to provide satisfactory solutions. This can occur due to various factors, such as the technician's inattention to detail or expertise. In some cases, the technician may mistakenly believe that the problem has been effectively resolved, when in reality it persists. Consequently, the site manager overseeing the terminal's operation or maintenance may assume that the issue has been resolved upon the technician's departure, only to discover later that the terminal remains non-functions for customers. Furthermore, the process of scheduling a follow-up visit by the technical can result in additional delays, prolonging the period during which the terminal remains out of service.

BRIEF DESCRIPTION OF THE DRAWINGS

FIG. 2 is a flow diagram of a method for auditing actions of a technician during a service visit to a terminal for compliance, according to an example embodiment.

DETAILED DESCRIPTION

Unnecessary service calls to transaction terminals are created due to poor servicing practice or activity. This results in significant terminal downtime; each avoidable terminal fault results in multiple hours of terminal downtime per instance of poor servicing.

The above technical issues are solved by the technical solutions provided herein and below. According to an embodiment of the technology disclosed herein, a service technician's on-site service workflow is enhanced to include the technician using their mobile device's integrated camera to capture an image of one or more of components of the terminal when one or more actions taken by the technician during a service call are completed. The image is analyzed to determine if the one or more actions are compliant or non-compliant. The technician is notified in real time or near real time as to whether the actions were compliant or non compliant via the mobile device. In an embodiment, a site manager is notified when the actions are non compliant such that the site manager can potentially stop the technician from leaving the site without a problem being experienced by the terminal being fully resolved.

In an embodiment, integrated cameras located inside a housing of the terminal and the cameras capture images of the components of the terminal during the service call. The images are analyzed for action compliance and the technician and/or site manager are notified in real time or near real time when the technician's actions are deemed non compliant.

As used herein a "technician," a "service technician," a "customer engineer," a "service engineer," and/or a "user" may be used interchangeably and synonymously. This is an individual that was dispatched to a terminal to perform maintenance actions on the terminal based on an error code or a fault being raised from the terminal.

A "transaction terminal" and/or "terminal" refers to a standalone composite device operated to perform transactions for or by consumers. A terminal can include an automated teller machine (ATM), a self-service terminal (SST), a point-of-sale (POS) terminal, or a kiosk.

Figure 1A:
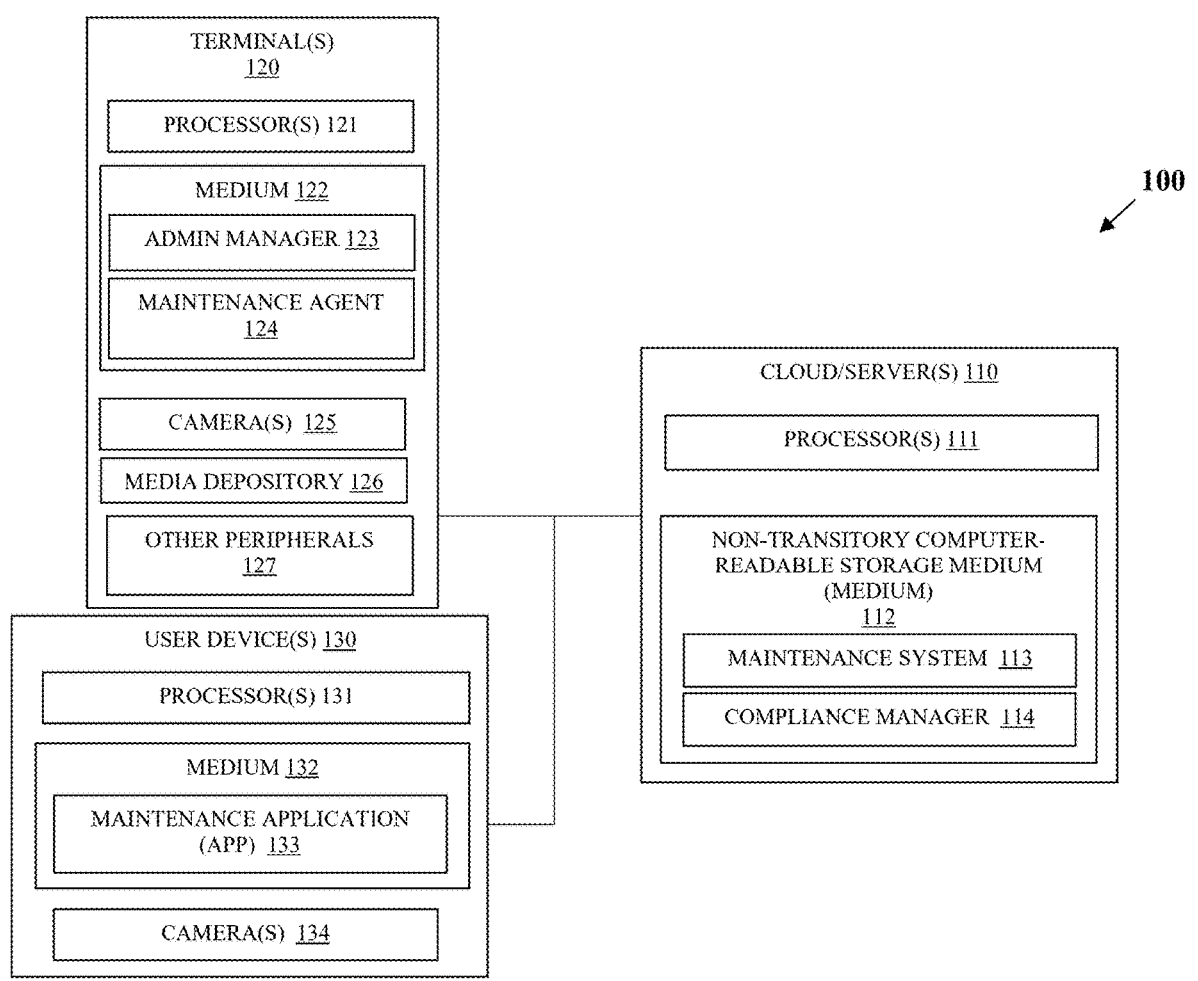
FIG. 1A is a diagram of a system for auditing actions of a service technician for compliance during a service visit to a terminal, according to an example embodiment.

FIG. 1A is a diagram of a system 100 for auditing actions of a service technician for compliance during a service visit or service call to a terminal, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of auditing actions of a service technician for compliance during a service visit or service call to a terminal, presented herein and below.

System 100 includes a cloud/server 110 (hereinafter just "cloud 110"), one or more terminals 120, and one or more user devices 130. Cloud 110 includes at least one processor 111 and a non-transitory computer-readable storage medium (hereinafter just "medium") 112, which includes instructions for a maintenance system 113 and a compliance manager 114. The instructions when provided to and executed by processor 111 cause processor 111 to perform the processing or operations discussed herein and below with respect to 113--114.

Each terminal 120 includes at least one processor 121 and a medium 122, which includes instructions for an administration manager 123 and a maintenance agent 124. The instructions when provided to and executed by processor 121 cause processor 121 to perform the processing or operations discussed herein and below with respect to 123-124. The terminal 120 also includes one or more cameras 125, a media depository 126, and other peripherals 127, such as a scanner, a card reader, a weigh scale, a baggage scale, a touch display, a media depository acceptor, a media depository dispenser, a keypad, wireless transceivers, etc.

Each user device 130 includes at least one processor 131 and a medium 132, which includes instructions for a maintenance application (app) 133. The instructions when provided to and executed by processor 131 cause processor 131 to perform the processing or operations discussed herein and below with respect to 133. User device 130 further includes at least one integrated camera 134.

Initially, a processing workflow associated with detecting terminal 120 error codes or faults, scheduling service calls, and reporting terminal service call actions taken is enhanced to integrate images captured of one or more components of the terminal 120 during the service calls and the compliance manager 114 into the workflow. During operation of system 100, terminal 120 encounters and error code, which may be a severe fault or may be something impending that could lead to a severe fault eventually or imminently. Maintenance agent 124 traps or detects the error code and reports the error code to maintenance system 113. Maintenance system generates a service ticket, assigns a service technician to the ticket, and schedules a service call for the technician to visit the site associated with the terminal 120 and remedy the error code.

Maintenance system 113 sends notice of the site's location, the terminal 120, the ticket, the error code, the scheduled date and time of the service call, and, optionally, instructions for remedying the error code on the terminal 120 to a user device 130 of the technician through a user interface (UI) of maintenance app 133. On the scheduled data and time, the technician visits the site and the terminal 120 for performing maintenance actions to resolve the error code. The technician interacts with the UI of the maintenance app 133 during the service call to obtain instructions for resolving the error code, record maintenance actions taken during the service call, and indicate whether the error code was resolved or not resolved. While the technician interacts with the UI, maintenance app 133 interacts with maintenance system 113.

In an embodiment, when the technician reports through the UI that a maintenance action was completed, the UI instructs the technician to take a photograph or image of the component or components relevant to the maintenance action. The maintenance app 133 sends the image depicting the component(s) after completion of the relevant maintenance action to compliance manager 114 along with the reported error code associated with the service ticket. In an embodiment, maintenance app 133 also sends a terminal identifier for the terminal 120 to compliance manager 114, which allows compliance manager 114 to map the terminal identifier to a terminal type and model and map the error code to a specific component or set of components associated with the terminal 120.

Upon receipt of the information from the maintenance app 133, compliance manager 114 analyzes the image against a model image associated with the component for which the error code is resolved. In an embodiment, compliance manager 114 uses a machine learning model trained to compare terminal component images with associated error codes against model component images associated with resolved error codes and provide as output an indication if the inputted component images are compliant or non-compliant with resolution of the corresponding error codes.

In an embodiment the machine learning model is a combination of a convolutional neural network (CNN) and vision transformers (ViT) that categorizes or predicts service compliance and non-compliance providing real-time feedback. The combination of CNN and ViT in the model provides a multi-model solution for performance and high scalability. The Vit portion of the model draws information from a whole image whereas the CNN portion of the model performs a local analysis, which is focused on a smaller neighborhood of the image. This provides a higher degree of accuracy than traditional uses of artificial intelligence (AI) models.

Compliance manager 114 determines whether a component image is compliant or not compliant with resolving a given error code in real time. When non-compliance is determined, compliance manager 114 sends a real-time alert or notification to the UI of maintenance app 133 along with a model image of how the component should look if the error code were properly resolved.

In an embodiment and when non-compliance is determined, compliance manager 114 sends a real-time alert to a user device 130 of a site manager associated with the terminal 120; the alert indicating that the error code for the terminal 120 has not yet been properly resolved by the service technician. This affords the site manager the opportunity to intervene and attempt to stop the technician before the technician leaves the site because once the technician leaves the site a subsequent service call will need scheduled, which means the terminal 120 will remain offline and unavailable for transactions to customers until at least the time of the rescheduled service call.

In an embodiment, compliance manager 114 maintains metrics indicating whether any non-compliance was detected and reported to the service technician in real time and terminal hardware metrics obtained from maintenance agent 124 or maintenance system 113, and service technician and/or provider identifiers along with a link to the service record maintained in the maintenance system 113. These metrics can be used by the site manager or maintenance provider to determine when to switch service technician providers based on performance of the service technician providers.

In an embodiment, compliance manager 114 provides an audit service based on the metrics to the retailer, financial institution (FI), store, and/or site manager associated with serviced terminals 120. For example, service charges associated with service calls with outstanding and unresolved error codes can be automatically refunded or not invoiced.

In an embodiment, compliance manager 114 also sends positive alerts to the technician during a service call via the UI of maintenance app 133. This allows the technician to confirm maintenance actions are being performed properly in real time during a service call visit to a terminal 120.

This maintenance actions and corresponding analyzed images can be associated with a variety of components of the a given peripheral of the terminal 120, such as a media cassette of a media recycler 126, a rack of media cassettes of the media depository 126, an upper transport module of the media depository 126, a lower transport module of the media depository 126, an escrow bin of the media depository 126, a reject bin of the media depository 126, a deskew module of the media depository 126, media validation modules of the media recycler, and infeed module of the media depository 126, etc. The maintenance actions and corresponding analyzed images can also be associated with other peripherals 127 of the terminal 120, such as an encrypted personal identification number (PIN) pad peripheral, a card reader peripheral, a weigh scale peripheral, a combined weight scale and scanner peripheral, a scanner peripheral, a baggage weigh scale peripheral, a receipt printer, a touchscreen peripheral, etc.

Example UI screens rendered from the maintenance app 133 to a technician during a service call at a terminal 120 are now discussed for illustration of system 100's features with FIGS. 1B-1E. The components illustrated in FIGS. 1B-1E are associated with media cassettes and a media cassette rack of the media depository 126. It is noted that the components can be for other different components of the media depository 126 or other components associated with the other peripherals 127.

In an embodiment, the media depository 126 is a media recycler. In an embodiment, the media depository is a cash and/or currency dispenser. In an embodiment, the media depository is a combined cash depositor and dispenser.

Figure 1B:
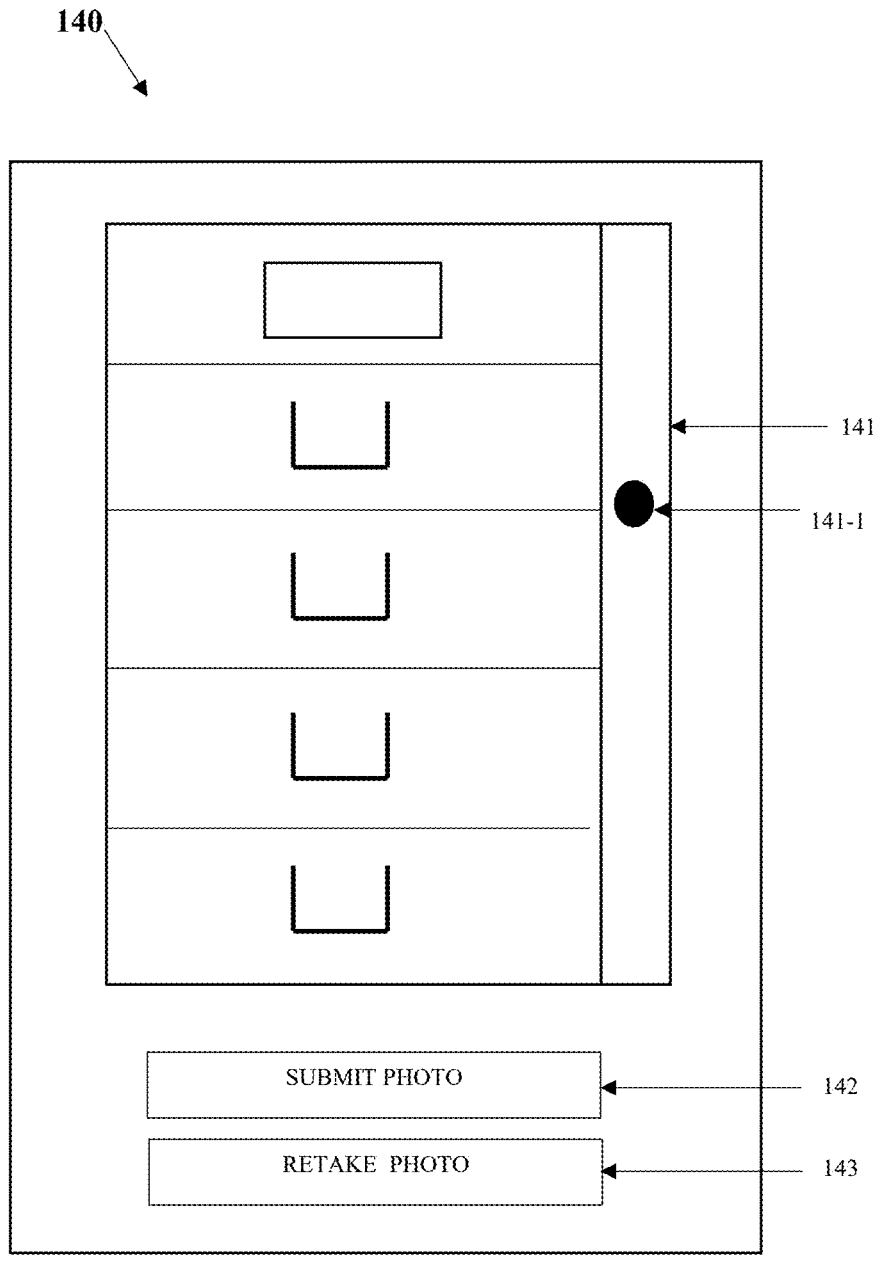
FIG. 1B is screen rendered in a user interface depicting an image taken by the technician for components of the terminal along with user interface options regarding the image, according to an example embodiment.

FIG. 1B is screen 140 rendered in the UI of the maintenance app 133 depicting an image 141 taken by the technician for components of the terminal 120 along with UI options regarding the image 141, according to an example embodiment. The components illustrated within the screen 140 depict a media cassette rack and individual media cassettes of the rack. The screen 140 depicts an image 141 taken by a technician using camera 134 of user device 130 within the context of the UI for maintenance app 133.

The image 141 depicted within the screen 140 is also rendered with UI options that can be selected by the technician to submit the image/photo 141 to compliance manager 114 for compliance analysis or to retake the image/photo 141. The image 141 also depicts a status light 141-1 associated with media cassette rack, the status light 141-1 is darkened in FIG. 1B to depict that the status light 141-1 is red. A red light is an indication that media cassette rack is not full inserted back into the housing of the media depository 126. Thus, the technician has not resolved the error code completely yet for the service call that dispatched the technician to the terminal 120. The media cassette rack needs to be fully inserted into the housing such that the status light is green.

If the technician selected the submit photo 142 option from the screen 140 of the UI, compliance manager 114 analyzes the image 141 and determines that the error code is not resolved and therefore the maintenance action is non-compliant. Compliance manager 114 sends a real-time alert back to maintenance app 133 along with a message that the media cassette rack is not fully inserted into the housing. Maintenance app 133 renders the alert and message through another UI screen of the UI to the technician. Simultaneously, a status that the service visit is unresolved is sent to a user device 130 of the site manager associated with the terminal 120.

Based on the real-time alert sent to the technician, the technician knows to reinsert the media cassette rack until a green light is shown. This is shown in FIG. 1C.

Figure 1C:
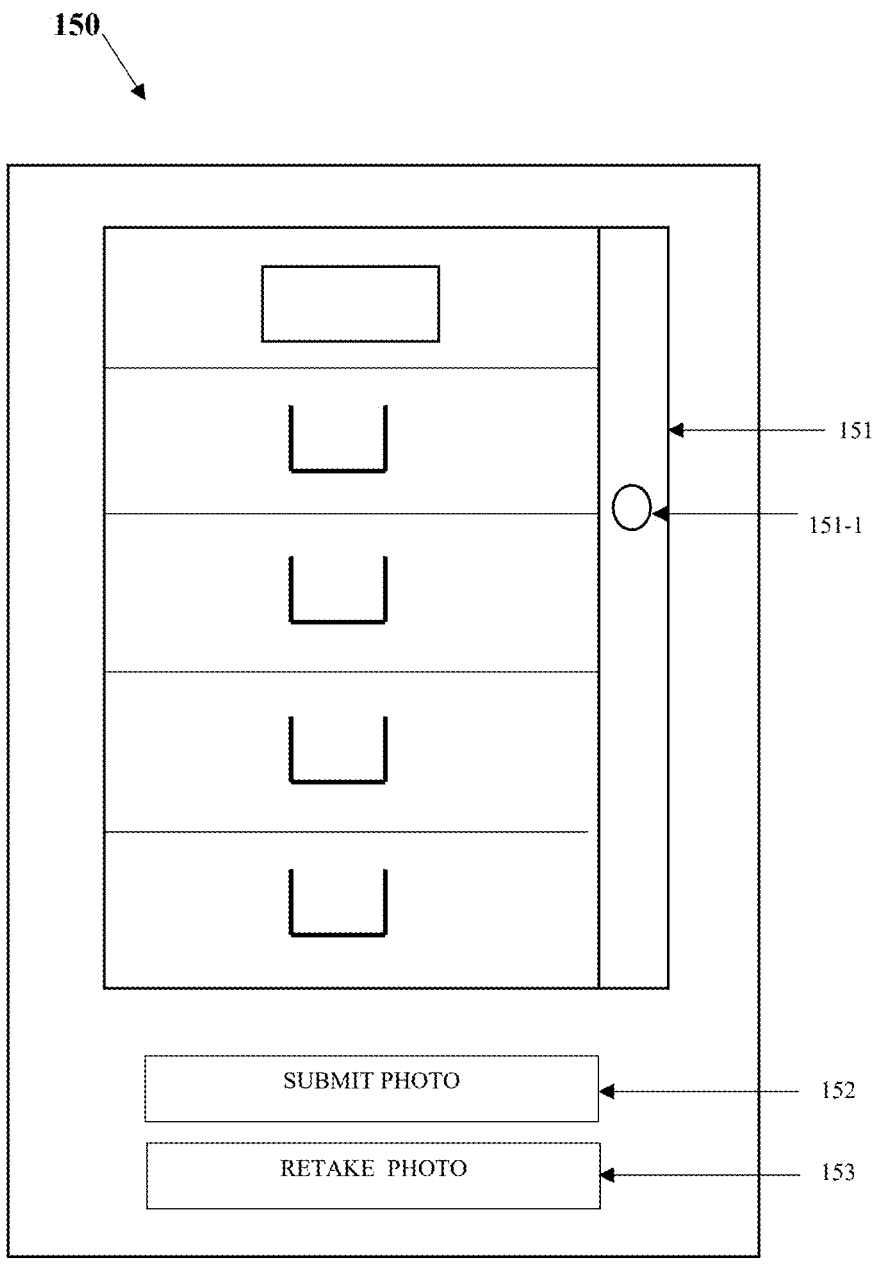
FIG. 1C is another screen rendered in the user interface depicting an image taken by the technician for the components of the terminal along with user interface options regarding the image, according to an example embodiment.

In an embodiment, status light 141-1 is a small display, which displays show a status code rather than an illuminated light depicted in FIG. 1C. In an embodiment, the status code is a hexadecimal code that is captured in the image and analyzed to determine the real-time alert sent to the technician.

FIG. 1C is another screen 150 rendered in the UI depicting an image 151 taken by the technician for the components of the terminal 120 along with UI options regarding the image 151, according to an example embodiment. Again, the components illustrated within the screen 150 depict a media cassette rack and individual media cassettes of the rack. The screen 150 depicts an image 151 taken by a technician using camera 134 of user device 130 within the context of the UI for maintenance app 133.

The image 151 depicted within the screen 150 is also rendered with UI options that can be selected by the technician to submit the image/photo 151 to compliance manager 114 for compliance analysis or to retake the image/photo 151. The image 151 also depicts a status light 151-1 associated with media cassette rack, the status light 151-1 is not darkened in FIG. 1C to depict that the status light 151-1 is green. A green light is an indication that media cassette rack is full inserted back into the housing of the media depository 126.

Assuming the technician selects the submit photo option 152 and does not select the retake photo 153 option, maintenance app 133 sends the image 151 to compliance manager 114. Compliance manager 114 verifies that the image 151 matches a model image for the error code and does in fact depict a green lit status light 151-1. Compliance manager 114 confirms that the technician has resolved the error code completely and can close the service ticket associated with the service call via the UI of maintenance app 133 through interaction with maintenance system 113.

Compliance manager 114 sends a real-time positive feedback alert to the technician through maintenance app 133 via the UI which indicates that the maintenance action was compliant. Compliance manager 114 also sends a real-time alert to a user device 130 of the site manager which indicates the service call was compliant and successfully completed.

Notably, in addition to a racking state, the status light 151-1 can be associated with other different fault conditions of the media depository 126. Thus, in an embodiment, there is more than one status light 151-1. In an embodiment, the illumination of colors on a single status light 151-1, a visual pattern of different colors by the single status light 151-1, strobing effect of one or more colors of the single status light 151-1, and/or any of these with multiple status lights can be associated with other different fault conditions of the media depository.

Figure 1D:
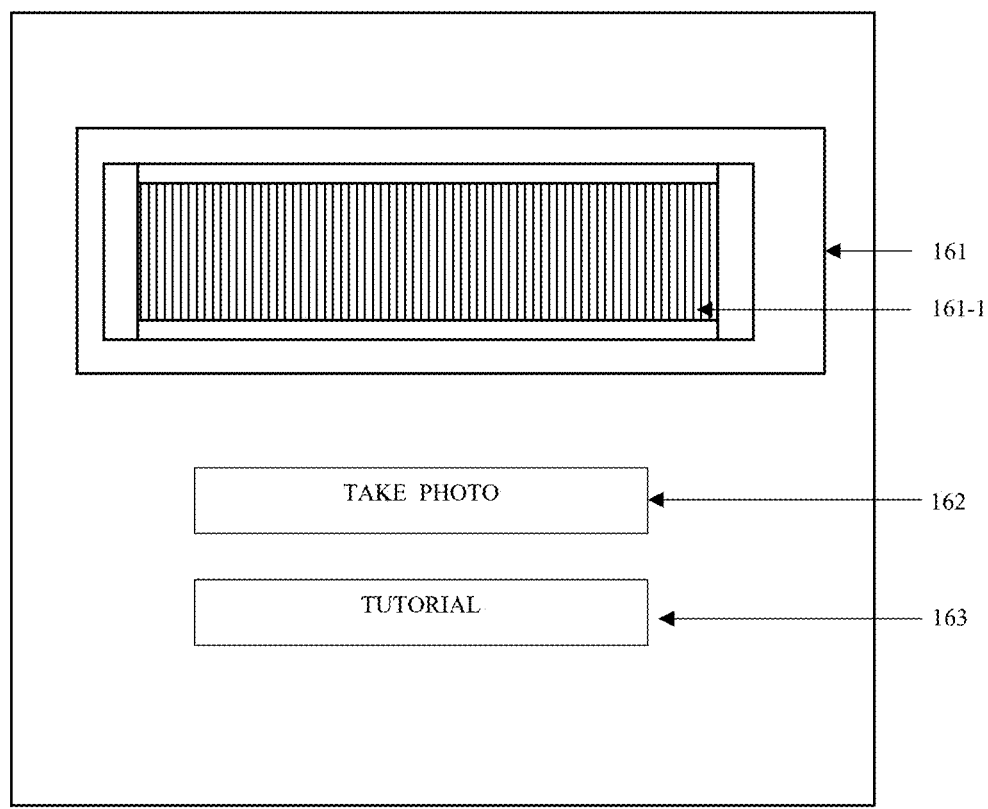
FIG. 1D is yet another screen rendered in the user interface depicting a particular component of the terminal in real time before an image of the particular component is captured along with other user interface options, according to an example embodiment.

FIG. 1D is yet another screen 160 rendered in the UI depicting a particular component of the terminal 120 in real time before an image 161 of the particular component is captured along with other user interface options, according to an example embodiment. The component illustrated within the screen 160 depicts a media cassette. The screen 160 depicts a real-time image 161 that has yet to be taken by a technician using camera 134 of user device 130 within the context of the UI for maintenance app 133.

The screen 160 displays in real time what is placed within the view finder of the camera 134, which in this situation is a top-down view of a media cassette loaded with media 161-1, such as currency notes. Here, the technician's maintenance action was related to replenishing a media 161-1 or cash denomination within the media cassette. In an embodiment, the technician is an employee of a cash-in transit (CIT) service dispatch to replenish media notes to resolve an error code associated with media replenishment.

The screen 160 also includes selectable UI options to take a photo/image 162 of the media loaded cassette or view a tutorial on how to properly load media 161-1 into a cassette through the UI of maintenance app 133. Assuming the technician takes the photo by selecting the take photo option 162 and in a subsequent UI screen submits the photo to compliance manager 114, compliance manager 114 receives the image 161 and verifies that the media cassette is properly loaded. Compliance manager 114 sends a real time positive feedback alert to the technician through the maintenance app 133 via the UI and, optionally, sends a real-time alert to the site manager indicating that the media cassette was properly replenished to resolve the replenishment issue associated with the terminal 120.

Figure 1E:
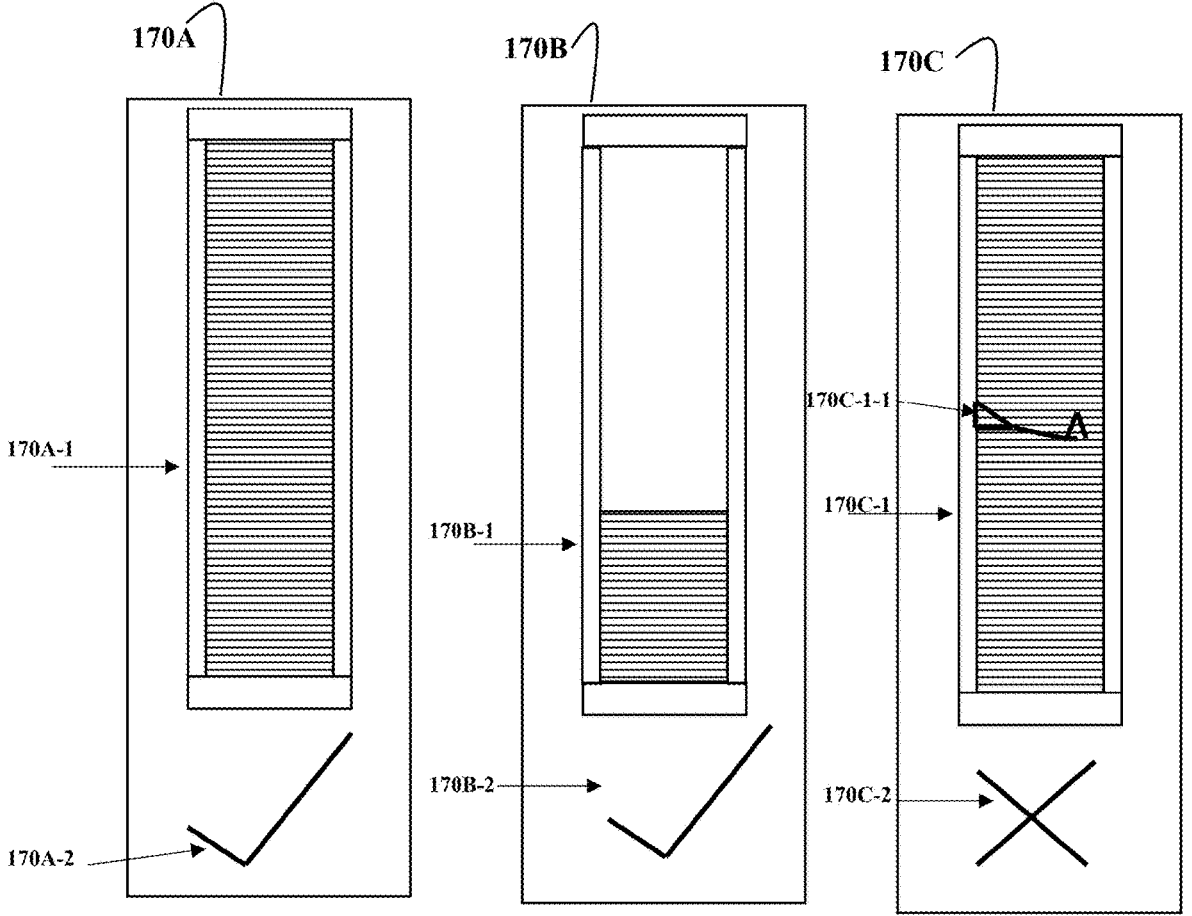
FIG. 1E is a set of three different screens rendered in the user interface depicting images of a particular component of the terminal and user interface graphic indicating whether each of the images are acceptable or not acceptable, according to an example embodiment.

FIG. 1E is a set of three different screens 170A, 170B, and 170C rendered in the UI depicting images of a particular component of the terminal 120 and UI graphics indicating whether each of the images 170A, 170B, and 170B are acceptable or not acceptable, according to an example embodiment. Again, the components illustrated within the screens 170A, 170B, and 170C depict a media cassette. The screens 170A, 170B, and 170C depicts a real-time alert received by the maintenance app 133 from the compliance manager 114 and rendered through the UI.

Screen 170A depicts a situation in which the compliance manager 114 has determined based on a submitted image 170A-1 from the maintenance app 133 by the technician that media was properly loaded and replenished within the media cassette. As a result, a large graphic checkmark is presented within the screen 170A as a positive real-time feedback alert to the technician.

Screen 170B depicts a situation in which the compliance manager 114 has determined based on a submitted image 170B-1 from the maintenance app 133 by the technician that media was properly but only partially replenished within the media cassette. As a result, a large checkmark is presented within screen 170B as a positive real-time feedback to the technician. It is noted that had the submitted image 170B-1 depicted a rubber band or other object placed around the partially replenished media cassette, non-compliance would have been detected which would have resulted in the technician receiving a negative feedback.

Screen 170C depicts a situation in which the compliance manager 114 has determined based on a submitted image 170C-1 from the maintenance app 133 by the technician that the media loaded and replenished is not properly aligned within the media cassette and includes one or more media notes 170C-1-1 out of alignment. As a result, a large graphic X is presented within screen 170B as a negative real-time feedback to the technician.

System 100 reduces service calls and follow-up service calls required of technicians to remedy error codes associated with terminals 120 by providing real-time positive or negative feedback to the technicians based on images of components associated with asserted completed maintenance actions. The images are analyzed in real time based on model images associated with the components. In an embodiment, real-time status alerts or notifications relevant to the maintenance actions are sent to site managers associated with the terminals 120, which allows the site owners to monitor the service calls to the terminals 120 in real time. In an embodiment, metrics are maintained for the service calls and provided to the site owners for determinations as to whether service call reimbursements are warranted or whether a service provider should be changed.

In an embodiment, the processing associated with the compliance manager 114 is subsumed into the maintenance app 133. In this manner, response times and feedback is nearly instantaneous as soon as images of components of the terminal relevant to maintenance actions are submitted from the UI by a technician. In an embodiment, the maintenance system 113 is processed on a different server or cloud from the cloud 110 that processes the compliance manager 114.

In an embodiment, an Internet-of-Things (IoTs) camera or cameras are placed within a housing of the terminal 120 at predefined locations. The cameras wirelessly transmit images of components of the during a service session between a service technician and maintenance system 113. The maintenance app 133 and/or maintenance system 113 provide an error code for the component being service and terminal identifier for the terminal 120 to compliance manager 114. Compliance manager 114 obtains the correct images for the component being serviced from the corresponding IoTs cameras. Compliance manager 114 uses these images for analysis to determine when maintenance actions taken by the technician or compliant or non compliant during the service session. Compliance manager 114 sends real-time positive and negative feedback regarding the maintenance actions to maintenance app 133 for presentation to the technical via the UI of the maintenance app 133. Compliance manager 114 can distinguish between IoTs cameras based on camera identifiers being mapped or linked to specific components of the terminal 120. In an embodiment, an IoTs camera is situated within each media cassette in a top corner on a lid that covers a top of the cassette. In the case of the top corner camera location, when the technician shuts the lid after replenishing media and the camera sends a real-time image to compliance manager 114, which is evaluated in real time for compliance or non-compliance associated with the loaded media within the cassette.

In an embodiment, a combination of maintenance app 133 supplied images of components of the terminal 120 and IoTs camera supplied images are received by compliance manager 114 during a technician session with maintenance system 113 during a service visit to the terminal 120. Compliance manager 114 selects optimal images of a corresponding component from the maintenance app 133 supplied images and the IoTs camera supplied images for a component based on the error code reported for the terminal 120. Compliance manager 114 evaluates the optimal images for compliance or non-compliance and provides positive or negative feedback in real time to the technician via the UI of maintenance app 133.

The above-referenced embodiments and other embodiments are now discussed with reference to FIGS. 2 and 3. FIG. 2 is a flow diagram of a method 200 for auditing actions of a technician during a service visit to a terminal for compliance. The software module(s) that implements the method 200 is referred to as a "maintenance action compliance manager." The maintenance action compliance manager is implemented as executable instructions programmed and residing within memory and/or a non-transitory computer-readable (processor-readable) storage medium and executed by one or more processors of one or more devices. The processor(s) of the device(s) that executes the maintenance action compliance manager are specifically configured and programmed to process the maintenance action compliance manager. The maintenance action compliance manager may have access to one or more network connections during its processing. The network connections can be wired, wireless, or a combination of wired and wireless.

In an embodiment, the device that executes the maintenance action compliance manager is cloud 110 or server 110. In an embodiment, the devices that execute the maintenance action compliance manager are cloud 110 and terminal 120. In an embodiment, the devices that execute the maintenance action compliance manager are cloud 110 and user device 130. In an embodiment, the maintenance action compliance manager is any combination of or all of maintenance system 113, compliance manager, maintenance agent 124, and/or maintenance app 133.

At 210, maintenance action compliance manager receives an image depicting a component of a terminal 120 after a maintenance action was performed during a service call by a technician. In an embodiment, at 211, the maintenance action compliance manager receives the image from the technician who is operating the user device 130 and interacting with the UI during the service call.

In an embodiment, at 212, the maintenance action compliance manager receives the image from an IoTs camera that is focused on the component. The IoTs camera wirelessly transmits the image during the service call and after the maintenance action is performed by the technician.

In an embodiment, at 213, the maintenance action compliance manager receives an error code associated with the component. The error code is associated with a service ticket or service record for the service call.

At 220, the maintenance action compliance manager compares the image against a model image of the component after a model maintenance action was performed on the component. In an embodiment of 220 and 213, at 221, the maintenance action compliance manager obtains the model image for the component based on the error code and the model maintenance action.

In an embodiment, at 222, the maintenance action compliance manager processes a CNN with ViT using the image, the model image, and the error code as input. The maintenance action compliance manager receives as output a compliant indication or a non-compliant indication.

At 230, the maintenance action compliance manager provides real-time feedback to the technician through a UI of a maintenance app 133 processed on the user device 130 of the technician during the service call based on 220. In an embodiment, at 231, the maintenance action compliance manager provides the model image and a non-compliant indication to the UI when 230 indicated that the image depicts a non-compliant maintenance action for the maintenance action performed by the technician. In an embodiment, at 232, the maintenance action compliance manager provides a compliant indication to the UI when 230 indicated that the image depicts a compliant maintenance action for the maintenance action performed by the technician.

In an embodiment, at 240, the maintenance action compliance manager sends a real-time notification to a second user device 130 associated with a site manager. The site manager is responsible for operation of the terminal 120 and the real-time notification is provided as a real-time status update to the site manager for the service call.

In an embodiment, at 250, the maintenance action compliance manager maintains metrics for the service call in a data store. The data store is associated with the terminal 120, a service provider associated with the technician, and a site of the terminal associated with an enterprise.

In an embodiment of 250 and at 251, the maintenance action compliance manager generates and provides reports from the data store to the service provider and the enterprise. The reports are relevant to the service call and other service calls to the site or other sites of the enterprise.

Figure 3:
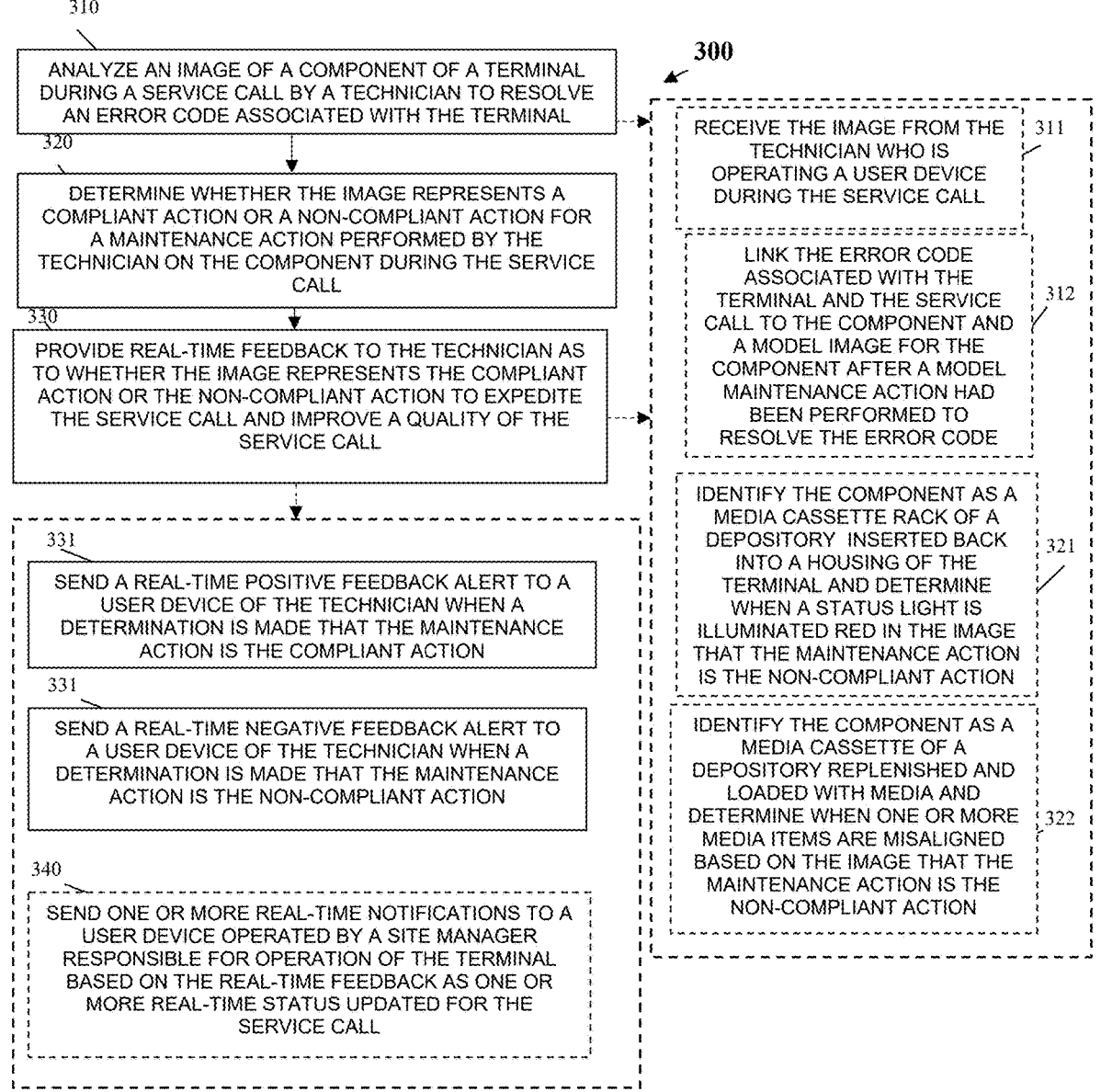
FIG. 3 is a flow diagram of another method for auditing actions of a technician during a service visit to a terminal for compliance, according to an example embodiment.

FIG. 3 is a flow diagram of another method 300 for auditing actions of a technician during a service visit to a terminal for compliance, according to an example embodiment. The software module(s) that implements the method 300 is referred to as a "terminal maintenance auditor." The terminal maintenance auditor is implemented as executable instructions programmed and residing within memory and/or a non-transitory computer-readable (processor-readable) storage medium and executed by one or more processors of one or more device(s). The processors that execute the terminal maintenance auditor are specifically configured and programmed for processing the terminal maintenance auditor. The terminal maintenance auditor may have access to one or more network connections during its processing. The network connections can be wired, wireless, or a combination of wired and wireless.

In an embodiment, the device that executes terminal maintenance auditor is cloud 110 or server 110. In an embodiment, the devices that execute the terminal maintenance auditor are cloud 110 and terminal 120. In an embodiment, the devices that execute the terminal maintenance auditor are cloud 110 and user device 130. In an embodiment, the terminal maintenance auditor is any combination of or all of maintenance system 113, compliance manager 114, maintenance agent 124, maintenance app 133, and/or method 200. The terminal maintenance auditor presents another and, in some ways, enhanced processing perspective from that which was discussed above for the system 100 of FIG. 1A, the user interface screens of FIGS. 1A-1E, and method 200 of FIG. 2.

At 310, the terminal maintenance auditor analyzes an image of a component of a terminal 120 during a service call by a technician to resolve an error code associated with the terminal 120. In an embodiment, at 311, the terminal maintenance auditor receives the image from the technician who is operating a user device 130 during the service call. In an embodiment, at 312, the terminal maintenance auditor links the error code associated with the terminal 120 and the service call to the component and a model image for the component after a model maintenance action had been performed to resolve the error code.

At 320, the terminal maintenance auditor determines whether the image represents a compliant action or a non-compliant action for a maintenance action performed by the technician on the component during the service call. In an embodiment, at 321, the terminal maintenance auditor identifies the component as a media cassette rack of a media depository 126, which is inserted back into a housing of the terminal 120. The terminal maintenance auditor determines when a status light is illuminated red in the image as an indication that the maintenance action performed by the technician is the non-compliant action.

In an embodiment, at 322, the terminal maintenance auditor identifies the component as a media cassette of a media depository 126 replenished and loaded with media. The terminal maintenance auditor determines when one or more media items are misaligned based on the image that the maintenance action is the non-compliant action.

At 330, the terminal maintenance auditor provides real-time feedback to the technician as to whether the image represents the compliant action of the non-compliant action to expedite the service call and to improve a quality of the service call. In an embodiment, at 331, the terminal maintenance auditor sends a real-time positive feedback alert to a user device 130 of the technician when a determination is made at 320 that the maintenance action is the compliant action. In an embodiment, at 332, the terminal maintenance auditor sends a real-time negative feedback alert to a user device 130 of the technician when a determination is made at 320 that the maintenance action is the non-compliant action.

In an embodiment, at 340, the terminal maintenance auditor sends one or more real-time notifications to a user device 130 operated by a site manager. The site manager is responsible for operation of the terminal 120 based on the real-time feedback. The one or more real-time notifications are provided to the site manager as real-time status updated for the service call.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving an image depicting a component of a terminal after a maintenance action was performed on the component during a service call by a technician;

comparing the image against a model image of the component after a model maintenance action was performed on the component;

wherein the comparing comprises:

obtaining the model image for the component based on an error code and the model maintenance action; and processing a convolutional neural network (CNN) with vision transformers (ViT) using the image, and the error code as input to receive a compliant indication or a non-compliant indication as output;

providing real-time feedback to the technician through a user interface (UI) of a maintenance application processed on a user device of the technician during the service call; and sending a real-time notification to a second user device associated with a site manager responsible for operation of the terminal based on the real-time feedback as a real-time status update for the service call.

2. The method of claim 1, wherein receiving further includes receiving the image from the technician who is operating the user device and interacting with the UI during the service call.

3. The method of claim 1, wherein receiving further includes receiving the image from an Internet-of-Things (IoTs) camera that is focused on the component and wirelessly transmits the image during the service call and after the maintenance action is performed by the technician.

4. The method of claim 1, wherein providing further includes providing the model image and a non-compliant indication to the UI when the comparing indicated that the image depicts a non-compliant maintenance action for the maintenance action performed by the technician.

5. The method of claim 1, wherein providing further includes providing a compliant indication to the UI when the comparing indicated that the image depicts a compliant maintenance action for the maintenance action performed by the technician.

6. The method of claim 1, further comprising, sending a second real-time alert to a second user device associated with a site manager responsible for operation of the terminal as a status update for the service call.

7. The method of claim 1, further comprising maintaining metrics for the service call in a data store associated with the terminal, a service provider associated with the technician, and a site of the terminal associated with an enterprise.

8. The method of claim 7 further comprising, generating and providing reports from the data store to the service provider and the enterprise relevant to the service call and other service calls to the site or other sites of the enterprise.

* * * * *